Dec. 1, 1959 R. C. ROBINSON 2,915,654
LINEAR RELUCTANCE MOTOR DRIVE
Filed Dec. 14, 1954 2 Sheets-Sheet 1

INVENTOR
Robert C. Robinson.
BY
ATTORNEY

United States Patent Office 2,915,654
Patented Dec. 1, 1959

2,915,654

LINEAR RELUCTANCE MOTOR DRIVE

Robert C. Robinson, Wilkinsburg, Pa., assignor to Westinghouse Electric Corporation, East Pittsburgh, Pa., a corporation of Pennsylvania Application December 14, 1954, Serial No. 475,071

12 Claims. (Cl. 310—14)

My invention pertains generally to linear motors and more particularly to a reluctance type of linear motor used as a positioning device.

Many times in engineering operations, such as in the operation of a chemical plant, it is desirable to effect controlled linear motion at various speeds, where the part moved may be within a pressure tight container. The prior art solution of this problem has been to employ a conventional form of drive operating through a linear seal. Also a rotating motor operating through a rotating seal and driving suitable mechanism for converting the rotary motion to linear motion within the pressure container has been suggested. Both of these devices may be satisfactory for some services but in many applications leakage through the seals cannot be tolerated. In order to overcome the problem of leakage it has been proposed to use a rotating motor designed to operate completely submerged in the fluid contained in the system. However, this method would still require a mechanical conversion of the rotary motion to linear motion.

In order to solve these problems I have developed a novel linear motor designed to operate while completely submerged in the fluid of the system. While linear motors are old, none of which I am aware are capable of operating while submerged in a fluid, nor are they capable of accurate positioning. All previous linear motors merely moved from one extreme of their travel to the other extreme and were not capable of being stopped at an intermediate position; these obviously could not be used as a positioning device.

Accordingly, the principal object of my invention is to provide a novel reluctance type of linear motor capable of operating as a positioning device.

Another object of my invention is to provide a unique linear motor capable of operating as a positioning device in a sealed pressure system.

Another object of my invention is to provide a linear motor having a novel hermetically enclosed circular stator adapted to operate while submerged in a fluid.

Another object of my invention is to provide a linear motor having a novel armature supported so that the armature is capable of linear movement within the hollow bore of a circular stator.

Another object of my invention is to provide a reluctance type of linear motor having a unique armature whose pole pitch is different than the pole pitch of the stator so that the armature will not cog.

These and other objects and advantages of my invention will be more apparent from the following detailed description of a preferred embodiment thereof when taken in conjunction with the accompanying drawings, in which.

The principle of operation of my reluctance type of linear motor is perhaps best explained by considering the stator as a stator of a rotating type reluctance motor which has been flattened out and then reformed transversely into a cylindrical shape. When the stator is reformed into a cylindrical shape the stator slots will be in a radial plane, instead of a longitudinal plane. When the stator is energized with polyphase electrical current a plurality of sinusoidal magnetic flux waves will build up along the longitudinal axis of the stator. This magnetic flux wave will move linearly along the longitudinal axis of the stator at a rate depending upon the frequency of the polyphase current. The moving body or armature of the linear motor will follow this moving magnetic flux wave. In order to ensure the moving body staying in synchronism with the moving magnetic field, I employ an armature having a salient pole structure as is customary with rotating type reluctance motors. The salient poles of the armature tend to line up with the points of maximum magnetic force and if the latter are moving, the armature follows in step. In order to position the moving armature of my linear motor accurately I provide a polyphase source of current whose frequency may be varied as desired. In order to stop the moving armature in any position, all that is necessary is to reduce the frequency of the current to zero while maintaining the stator windings energized.

Figure 1:
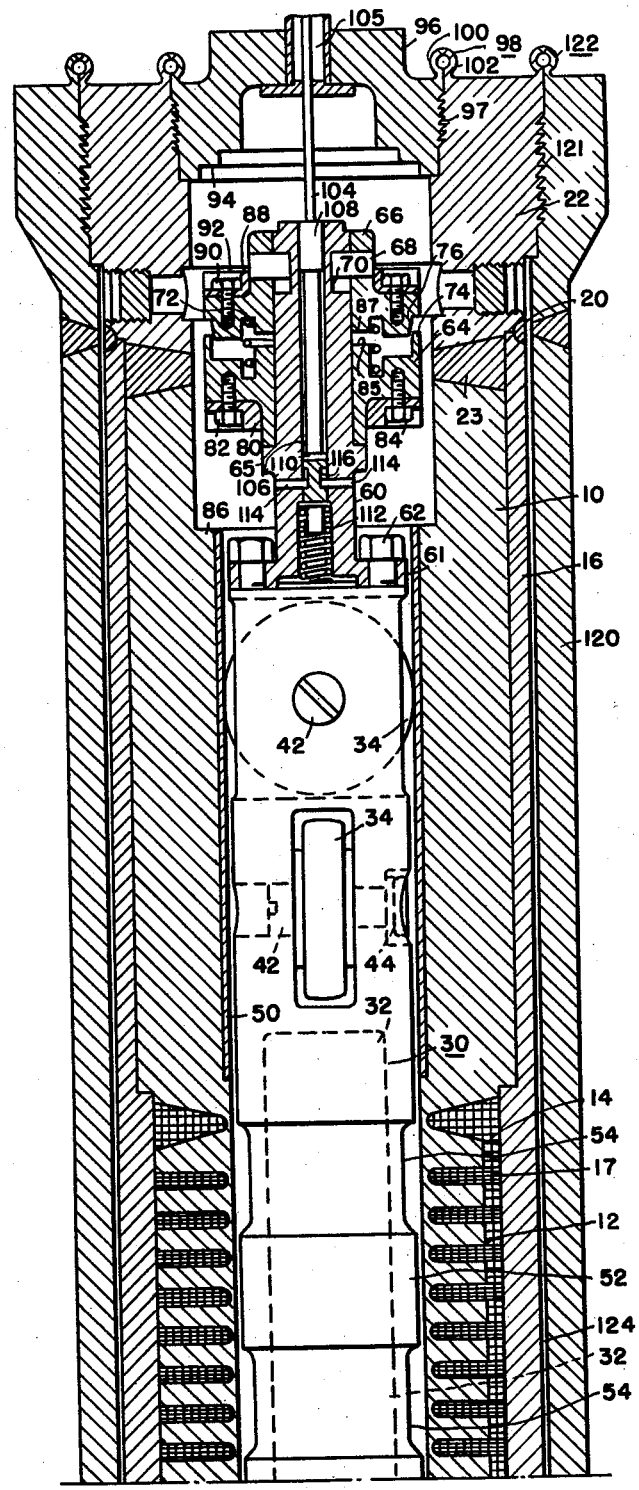
Figure 1 is a longitudinal section of the upper portion of a linear motor showing one embodiment of my invention.
Figure 2:
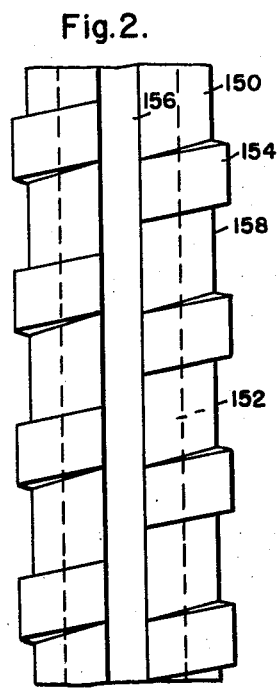
Fig. 2 is a longitudinal view of a portion of a modified armature for the linear motor illustrated in Figs. 1 and 1A.
Figure 1A:
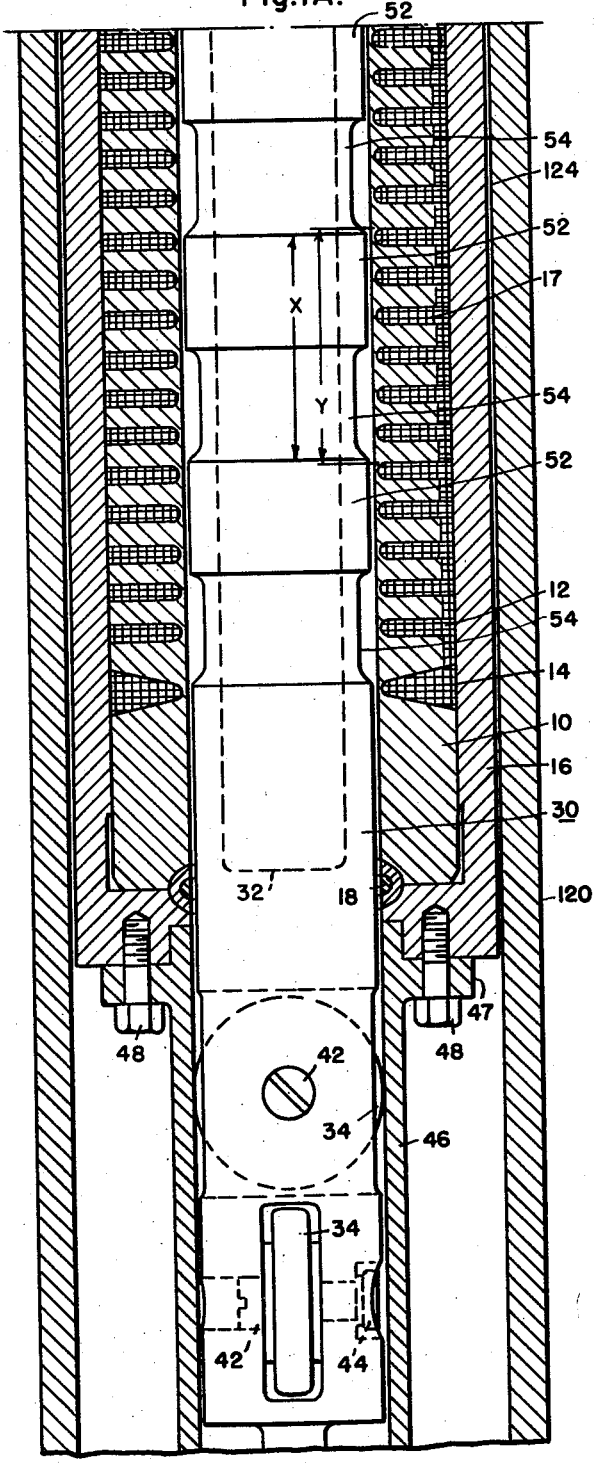
Fig. 1A is a longitudinal section of the lower portion of the linear motor shown in Fig. 1.

In practice, I have determined that the effect of the stator slots, under which the magnetic field is relatively weak, gives rise to a pronounced cogging effect or stepwise movement in the moving armature. This effect is very undesirable when the linear motor is employed as a positioning device because it causes the armature to jump from one position to the next instead of moving smoothly between the two positions. I have discovered that this cogging effect can be considerably reduced if the poles of the moving armature are skewed. One method which results in the same effect as skewing the poles of the moving armature is shown in Figs. 1 and 1A where the pitch of the poles on the armature is less than the pitch of the poles of the stator. A method of skewing the poles of the armature is shown in Fig. 2 where the edge of the pole is inclined at an angle other than 90° to the direction of motion of the armature so that part of the armature pole is always under a stator pole, thus there is always a force tending to move the armature. In both methods all of the armature poles do not pass under a stator pole simultaneously, thus averaging out the total force on the armature and producing a smooth movement of the armature without cogging.

Referring now particularly to Figs. 1 and 1A, there is shown a linear motor having a solid tubular stator core 10 desirably of a corrosion resisting magnetic material, such as magnetic stainless steel. The stator core 10 is provided with a plurality of radial slots 12 or other radial winding supporting means on the central portion of its outer surface, which slots, in this example, are formed by outwardly opening radial grooves. An enlarged end slot 14 desirably is provided at each end of the stator slots 12 on the stator core for receiving a radial stator winding of a different number of turns than the remaining stator slots 12 in order to reduce the cogging effect at each end of travel of the armature. These larger groups of windings induce stator poles which are in effect physically out of phase, or at a different pitch, relative to the remaining stator poles and thus militate against any stepwise movement of the armature as induced by the remaining poles. A suitable polyphase stator winding 17, in this example, is provided for the stator slots 12 and is connected in any desired manner, for example the windings in two adjacent stator slots 12 can be connected together to form a phase pole and three phase poles would then form one stator pole in case three phase current is used in exciting the stator. A heavy walled tubular magnetic member 16 desirably of a corrosion resisting magnetic material, such as magnetic stainless steel, surrounds the outer surface of the stator core and is attached to the stator core at both ends by any suitable means such as welds 18 and 20, respectively. The tubular member 16 serves three purposes in that it isolates the stator windings 17 from the fluid in the system in the event that the linear motor is immersed therein, reenforces the stator core, and completes the magnetic field of the stator. The radial slots 12 in the stator core considerably reduce the strength of the stator core with respect to lateral stresses and the tubular member 16 is provided to strengthen the stator core to resist bending forces. The tubular member 16 also completes the magnetic field of the stator between adjacent stator teeth. Attached to the upper end of the stator core by any suitable means, such as a weld 23, is a heavy annular ring 22 which is used in attaching the stator assembly to the outer housing 120, as will be described later.

While I have shown my stator to be formed from a solid core with outwardly opening radial slots it would be satisfactory to have it consist of a stack of laminations (not shown) having suitable slots. Alternatively the stator slots open inwardly (not shown) on either the solid core stator or a stator having a laminated core.

Mounted in the hollow bore of the stator core 10 is a movable armature 30, preferably of a corrosion resisting magnetic material such as magnetic stainless steel. Enclosed within the armature 30 by any suitable means, not shown, is a cylindrical core 32, preferably of a material having the greater magnetic permeability than the armature 30, such as soft iron. While I prefer to use a soft iron core 32 to increase the magnetic permeability of the armature, my linear motor will operate if the armature 30 is formed from a solid bar of magnetic material. The armature 30 is mounted for linear movement in the hollow bore of the stator core 10 by means of a pair of guide rollers 34 at each end of the armature. The rollers of each pair of guide rollers 34 are mounted with the axes of rotation of the rollers 34 perpendicular to each other and perpendicular to the axis of the armature 30. Each guide roller 34 is rotatably mounted in the armature 30 by means of a bolt 42 secured in the armature by means of a nut 44. In order to prevent undue wear of the inner surface of the stator core 10 by the guide rollers 34, I have provided tubular members of hardened material for the stator core 10 in the area in which the guide rollers 34 operate. The lower member is in the form of a separate tubular member 46, preferably of a relatively hard material, such as heat treated stainless steel, which extends downward from the lower end of the stator core 10, and has an outwardly projecting flange 47 at its upper end. The member 46 is secured to the lower end of the outer casing 16 by means of small cap screws 48 which are inserted through the flange 47 and are threaded into the outer casing 16. The insert at the upper end of the stator core is in the form of a thin-walled tubular member 50, also preferably of a relatively hard material, such as heat treated stainless steel, which is retained in the stator core 10 by means of a force fit.

The armature 30 has formed on its outer surface a plurality of spaced radial poles 52. The poles 52 are formed by reducing the diameter of the armature in a plurality of spaced areas 54. The reduced diameter portions of the armature are, in effect, reluctance grooves of the armature which correspond to the reluctance slots of a rotor of a rotating type of reluctance motor. In forming the poles 52 of the armature 30, the pole pitch, represented by the dimension X on Fig. 1A, is made slightly less than the pole pitch of the stator, represented by dimension Y.

By maintaining the pole pitch of the armature less than the pole pitch of the stator, I have considerably reduced the aforementioned cogging effect of the movable armature. This reduction in the cogging effect is due to the fact that as one pole of the armature passes through the maximum magnetic force area of one pole of the stator, another pole of the armature is just entering the area of maximum magnetic force under another pole of the stator. Thus the forces applied to the armature 30 are averaged out timewise, but the armature is always maintained in synchronism with the moving magnetic field of the stator. Thus, the armature 30 moves at a uniform rate without any tendency to jump from one area of maximum magnetic force of the stator to the next area of maximum magnetic force as the magnetic field moves along the stator. While I have shown the pole pitch X of my armature to be less than the pole pitch Y of the stator it would be equally satisfactory to have the armature pole pitch greater than the stator pole pitch.

In order to provide a controlled rate of deceleration at each limit of armature travel and to prevent a sudden shock to the control element which the armature is driving when the armature reaches the extreme limits of its travel which would occur if the armature hit a solid stop, I have provided a buffer arrangement at the upper end of my linear motor. My buffer arrangement consists of a buffer shaft 60 having an outwardly projecting radial flange 61, which is attached to the upper end of the armature 30 by means of cap screws 62 which are inserted through the flange 61 and are threaded into the upper end of the armature 30. Positioned on the upper end of the buffer shaft 60 is a buffer cylinder 64, whose central opening is made sufficiently large so that the buffer cylinder 64 is free to move longitudinally along the buffer shaft 60 within set limits to be explained later. A small outwardly projecting radial flange 65 near the lower end of the buffer shaft 60 limits the downward travel of the buffer cylinder 64. Also positioned on the upper end of the buffer shaft 60 on top of the buffer cylinder 64 is a buffer piston 66 which is held in a spaced-apart relation from the buffer cylinder 64 by means of a coil compression spring 72. The buffer piston 66 is retained on the upper end of the buffer shaft 60 by means of two opposed pins 68 which project into elongated slots 70 formed on the outer surface of the buffer shaft 60. The buffer cylinder 64 has formed on its top surface an annular recess with an outer diameter 74 into which the lower portion of the buffer piston 66 may move. The lower end of the buffer piston 66 has an inwardly tapering surface 76 the largest portion of which has a slightly smaller diameter than the diameter 74 of the buffer cylinder 64, so that as the buffer piston 66 moves into the annular recess in buffer cylinder 64 the annular area between the buffer piston 66 and the buffer cylinder 64 will be gradually restricted.

Attached to the lower end of the buffer cylinder 64, by means of countersunk cap screws 82, is a ring-shaped spacer 80. The lower surface 84 of the spacer 80 is adapted to contact the surface 86 formed by means of an inwardly projecting shoulder adjacent the upper end of the stator core 10 to thus limit the downward travel of the armature 30. Attached to the top surface of the buffer piston 66, by means of countersunk cap screws 90, is another ring-shaped spacer 88. The upper surface 92 of the ring-shaped spacer 88 contacts an inwardly projecting shoulder 94 formed on the end cap 96, to be described later, to thus limit the upward travel of the armature 30. The upper and lower limits of travel of the armature 30 can easily be changed by varying the thickness of the spacers 88 and 80 respectively.

As can be seen in Fig. 1, when the armature 30 moves upward and the upper surface of the spacer 88 contacts the surface 94 of the end cap 96, the buffer piston 66 will be forced downward thus compressing the spring 72. The buffer piston 66 will also trap a quantity of fluid in which the linear motor is operating in the cylinder formed in the upper surface of the buffer cylinder 64 and tend to compress it. The fluid trapped by the buffer piston 66 will escape through the annular area between the diameter 74 of the buffer cylinder 64 and the tapered surface 76 of the buffer piston 66, but its escape will be gradually restricted as the buffer piston 66 moves downward due to the tapered surface 76 of the buffer piston 66. Thus the combination of the compression of the spring 72 and the limited escape of the fluid from the buffer cylinder 64 will bring the armature 30 to a smooth stop at the upper limit of its travel. The buffer piston 66 is limited in its travel by the length of the elongated slot 70 formed in the buffer shaft 60, as previously described. The armature 30 is stopped in a similar manner at the lower limit of its travel by the movement of the buffer cylinder 64 in an upward direction when the surface 84 of the spacer 80 contacts the surface 86 of the armature core 10. The upward travel of the buffer cylinder 64 is limited by means of the surface 85 of the buffer cylinder 64 coming in contact with the lower surface 87 of the buffer piston 66.

The end cap 96 is threaded into the upper end of the stator core 22. The threaded connection 97 between end cap 96 and stator core 22 is made fluid-tight by means of a seal weld 98 formed by welding together upwardly projecting curved flanges 100 and 102 on end cap 96 and the upper end of the stator core 22, respectively.

Mounted in a central opening in the buffer shaft 60 is a rod 104 which projects through a central opening 105 in the end cap 96. The rod 104 may be used to drive a suitable position indicating device (not shown) to show the exact position of the armature 30. The position indicating rod 104 is guided by means of two enlarged portions 108 and 110 at the top and bottom of rod 104, respectively, which have a sliding fit in a central opening 106 of the buffer shaft 60. The position indicating rod may be shock mounted by means of a compression spring 112 at its lower end which reacts against the top of the armature 30 and the bottom of the position indicating rod 104 and is retained in the central opening 106 by means of two opposed pins 114 which project into longitudinal elongated slots 116 formed on the outer surface of the enlarged portion 110 of the position indicating rod. The elongated slots 116 allow a restricted longitudinal movement of the rod 104.

The stator core including the armature 30 and the buffer assembly is threaded into the tubular outer housing 120. The tubular outer housing 120 may be permanently attached to the pressure vessel in which the control element is located at its lower end (not shown). The threaded connection 121 is sealed by means of a small seal weld 122, similar in construction to seal weld 98, previously described. When the outer housing 120 is attached to the pressure vessel the fluid in the pressure vessel is allowed to completely fill the hollow bore of the stator core and the small annular space 124 between the stator core and the outer housing 120, but is prevented from escaping by means of the seal welds 98 and 122. The central opening 105 in the end cap 96 is capped at its upper end by any suitable means (not shown) to prevent the escape of the fluid via the opening 105 in end cap 96.

Shown in Fig. 2 is an alternate armature construction for the armature 30 of Fig. 1. In this construction the armature has an outer shell 150, desirably of a corrosion resisting magnetic material such as magnetic stainless steel, and an inner core 152 desirably of a material having a greater magnetic permeability such as soft iron. The salient poles are formed on the outer surface of armature 150 by means of a plurality of outwardly projecting flanges 154, which are formed in the shape of a spiral which is interrupted and the individual loops thereof displaced at a longitudinal groove 156. The portion 158 of the outer surface of armature 150 between the salient poles 154 forms, in effect, the reluctance groove for armature 150. Since the poles 154 are in the form of a spiral, a portion of the pole will be under a tooth and slot of the stator at all times and thus the armature will move smoothly in a longitudinal direction without any tendency to cog.

Figure 3:
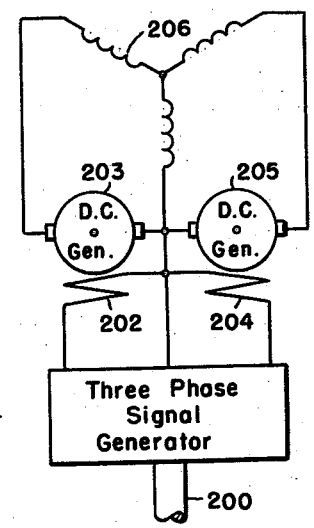
Fig. 3 is a schematic wiring diagram for the linear motor illustrated in Figs. 1 and 1A.

Shown in Fig. 3 is a schematic diagram of the circuit used to energize the stator windings of the linear motor shown in Figs. 1 and 1A. An input shaft 200 which is driven by any suitable means or even manually, drives a three-phase signal generator. The output from the three-phase signal generator is used to excite the field windings 202 and 204 of two D.C. generators 203 and 205, respectively. The potentials from the D.C. generators 203 and 205 are connected by means of an open delta to the stator windings 206 which represent the stator windings 17 of the linear motor shown in Figs. 1 and 1A. Thus, for every complete rotation of the input shaft 200, the stator 30 of Fig. 1 will move a definite amount in a linear direction. The direction of movement of the armature 30 can be changed by reversing the direction of rotation of the input shaft 200. If it is desired to stop the armature 30 in any position between its maximum limits of travel, all that is necessary is to stop the rotation of the input shaft 200. Then, the D.C. generators 203 and 205 will have a steady output and maintain a steady excitation of the stator windings 206 but will not develop a moving magnetic field in the stator windings.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. A linear motor comprising, a tubular stator assembly, an armature mounted for rectilinear movement within said stator assembly, said stator assembly comprising a solid tubular core having a plurality of radial slots formed in the outer surface thereof, a polyphase winding mounted in said radial slots, a tubular member closed at one end and closely receiving said stator core to cover the open sides of said radial slots, said tubular member being sealed to opposite ends of said core, and a plurality of salient magnetic poles formed on said armature.

2. A linear motor comprising a tubular stator assembly, said stator assembly comprising a tubular core having radial slots formed on the outer surface thereof for receiving an alternating current winding, a tubular member closed at one end closely receiving said tubular core to cover the open sides of said radial slots, said tubular member being sealed to opposite ends of said tubular core, an armature comprising a member of magnetic material mounted for rectilinear movement in said core and having at least two rollers mounted at opposite ends with their axes at an angle to each other for engaging the inner surface of said core, and a plurality of salient poles on the outer surface of said armature.

3. A linear motor comprising a tubular outer frame of non-magnetic material sealed at one end, a fixed stator positioned on the inner surface of said frame and a movable armature mounted within said stator assembly, said stator assembly comprising a tubular core of magnetic material having a plurality of outwardly opening radial slots, a polyphase winding placed in said slots so as to form a plurality of magnetic poles along the axis of said stator assembly, a tubular member of magnetic material surrounding the outer surface of said stator core and sealed to opposite ends thereof; said armature comprising a hollow sealed outer shell of magnetic material enclosing an inner core of material having a greater magnetic permeability than said outer shell, at least two rollers mounted at each end of said armature with their axes of rotation perpendicular to each other and to the axis of said armature for engagement with said stator core, a plurality of magnetic salient poles on the outer surface of said armature formed by a plurality of radial outwardly extending flanges, the pitch of said armature poles being less than the pitch of said stator poles.

4. A linear motor comprising a tubular outer frame sealed at one end, a stator core positioned on the inner surface of said frame and an armature mounted within said stator core, said stator core and said armature being linearly movable relative to each other, said stator core having an alternating current winding so as to form a plurality of magnetic poles along the longitudinal axis of said stator core, a tubular member positioned on the surface of said stator core on which said stator winding is mounted and sealed at each end to said stator core so as to enclose said stator winding, and a plurality of salient poles formed on the outer surface of said armature.

5. A linear motor comprising, a solid, one piece tubular stator member having a relatively thick wall, a plurality of longitudinally spaced radial grooves in the outer surface of said stator member terminating short of the inner surface thereof to provide a solid uninterrupted inner surface for the stator member, stator windings mounted in said grooves to provide a plurality of poles spaced along the length of said stator member, a solid, one piece tubular member telescoped over said stator member with a close fit to close the open sides of said grooves and having its opposite ends sealed directly to the opposite ends, respectively, of said stator member beyond said grooves to hermetically enclose the stator windings in a rigid structure, and an armature mounted in said stator member for linear movement.

6. A linear electric motor comprising an elongated hollow stator assembly, means including a plurality of substantially radial windings for forming a plurality of magnetic poles spaced along the length of said stator assembly, an elongated armature mounted for substantially linear movement within said stator assembly, and a plurality of salient magnetic poles formed on said armature and spaced longitudinally thereof, the pitch of said armature poles being different than the pitch of said stator poles, so that at least one of said armature poles is juxtaposed to at least one of said stator poles, respectively, at any position of said armature.

7. A linear electric motor comprising an elongated hollow stator assembly, means including a plurality of substantially radial windings for forming a plurality of magnetic poles spaced longitudinally along said stator assembly, an elongated armature mounted for linear movement within said stator assembly, a plurality of salient magnetic poles formed on said armature and spaced longitudinally along said armature, and magnetic pole means coupled to at least one of said armature and said stator assembly for varying the pole pitch of at least a portion of said stator assembly relative to said armature so that at least one of said armature poles is juxtaposed respectively to at least one of said stator poles at any position of said armature.

8. A linear electric motor comprising an elongated hollow stator assembly, means including a plurality of substantially radial windings for forming a plurality of magnetic poles spaced longitudinally along said stator assembly, an elongated armature mounted for substantially linear movement within said stator assembly, a plurality of salient magnetic poles spaced longitudinally along said armature, said poles being disposed in the form of interrupted spiral loops.

9. A linear electric motor comprising an elongated hollow stator assembly, means for forming a plurality of magnetic poles spaced along the length of said stator assembly, said means including a plurality of substantially radial windings grouped to form said poles, the end-most of said groups being relatively larger than the remaining groups in order effectively to change the pitch of said stator poles adjacent each end-most group, an elongated armature mounted within said stator assembly for substantially linear movement in either direction thereof, and a plurality of salient magnetic poles disposed on said armature and spaced along the length thereof.

10. A linear electric motor comprising an elongated hollow stator assembly, a plurality of substantially radial slots formed in said stator assembly and spaced along the length thereof, polyphasal windings mounted in said slots and forming a plurality of radial magnetic stator poles spaced along the length of said stator assembly, means joined to said stator assembly to provide low reluctance magnetic paths for said stator poles, an elongated windingless armature mounted for substantially linear movement within said stator assembly, and a plurality of radially salient magnetic poles disposed on said armature and spaced along the length thereof.

11. A linear electric motor comprising an elongated hollow stator assembly, said assembly having a plurality of substantially radial slots formed therein and spaced along the length thereof, windings mounted in said slots and forming poles spaced along the length of said stator assembly, means associated with said assembly for facilitating the flow of magnetic flux of said stator poles, an elongated armature mounted within said stator assembly for substantially linear movement in either direction thereof, a plurality of salient magnetic poles disposed on said armature and spaced along the length thereof, and means varying the pole pitch of said stator assembly adjacent the ends thereof to reduce cogging of said armature adjacent the limits of its movement.

12. A linear electric motor comprising an elongated hollow stator assembly, said assembly having a plurality of substantially radial slots formed therein and spaced along the length thereof, windings mounted in said slots and forming poles spaced along the length of said stator assembly, means associated with said assembly for facilitating the flow of magnetic flux of said stator poles, an elongated armature mounted for substantially linear movement within said stator assembly, a plurality of salient magnetic poles disposed on said armature and spaced along the length thereof, and means varying the pole pitch of said stator assembly adjacent the ends thereof to reduce cogging of said armature adjacent the limits of its travel, said means including the provision of relatively enlarged endmost ones of said slots of said stator assembly and of a relatively larger number of said windings mounted within each of said endmost slots.

References Cited in the file of this patent

UNITED STATES PATENTS

| | | |
|---|---|---|
| 448,598 | Wheeler | Mar. 17, 1891 |
| 475,410 | McKay | May 24, 1892 |
| 573,823 | Leffler | Dec. 22, 1896 |
| 668,978 | Carlson | Feb. 26, 1901 |
| 1,089,778 | McLeer | Mar. 10, 1914 |
| 2,041,607 | Hopkins | May 19, 1936 |
| 2,160,076 | Lux | May 30, 1939 |
| 2,187,033 | Hubacker | Jan. 16, 1940 |
| 2,337,843 | Smith | Dec. 28, 1943 |
| 2,483,895 | Fisher | Oct. 4, 1949 |
| 2,615,068 | Radice | Oct. 21, 1952 |

FOREIGN PATENTS

| | | |
|---|---|---|
| 285,089 | Great Britain | May 10, 1929 |